CORRELATION SYSTEM

Filed April 2, 1957

Inventor
MARTIN MASONSON
By Philip M. Bolton
Attorney

United States Patent Office 2,906,956
Patented Sept. 29, 1959

2,906,956

CORRELATION SYSTEM

Martin Masonson, Nutley, N.J., assignor to International Telephone and Telegraph Corporation, Nutley, N.J., a corporation of Maryland Application April 2, 1957, Serial No. 650,173

12 Claims. (Cl. 324—83)

This invention relates to arrangements utilizing correlation techniques and particularly to correlation arrangements utilizing the mean squared difference method.

In some communication systems or spectro-analysis techniques such as those described in the U.S. patent application entitled "Electronic Spectro-analysis Computer," Serial No. 552,518 by Busignies et al., filed December 12, 1955, now Patent No. 2,866,899, and assigned to the same assignee as this application, International Telephone and Telegraph Corporation, the characteristics of an unknown signal function are determined by matching the unknown signal function against the various known signal functions of a "library" of such functions, or against a new signal produced by combining certain portions of the various signal functions from said "library" to provide a synthesized new function which will be the "best match" of the actual unknown signal function. The matching of the signal functions in the above mentioned schemes are correlation operations.

It is therefore an object of this invention to provide an improved correlation system which uses the method of mean squared difference as the basis of operation.

It is a further object of this invention to provide a correlation operation which takes the mean squared differences determined through a number of such correlations for comparison to obtain the least mean squared difference.

A still further object of the present invention is the provision of a system which obtains the mean squared difference of two signals being correlated and uses this as an error signal to correct the difference.

In accordance with a main feature of the present invention there is provided a correlation device which takes the difference between two signals applied to the input terminals thereof to obtain a difference signal, squares the difference signal and integrates the squared difference signal to obtain a voltage which represents the means squared difference between the two signals.

In accordance with a second feature of the present invention there is provided a source of a plurality of "library" signals which are used for comparison with a second signal for determining which of said "library" functions represents a "best match" for said second signal by the method of least mean squared difference.

In accordance with a further feature of the present invention there is provided a servo loop including a phase shifting means which is coupled between the output of the correlation device and the input of the correlation device which is coupled to the reference signal or the "library" signals such that the mean squared difference signal acts as an error signal, to cause the servo loop to function, thus adjusting the phase of the reference signal or library signal until a null point is reached.

The above-mentioned and other features and objects of this invention will become more apparent by reference to the following description of embodiments thereof taken in conjunction with the accompanying drawings in which.

Figure 1:
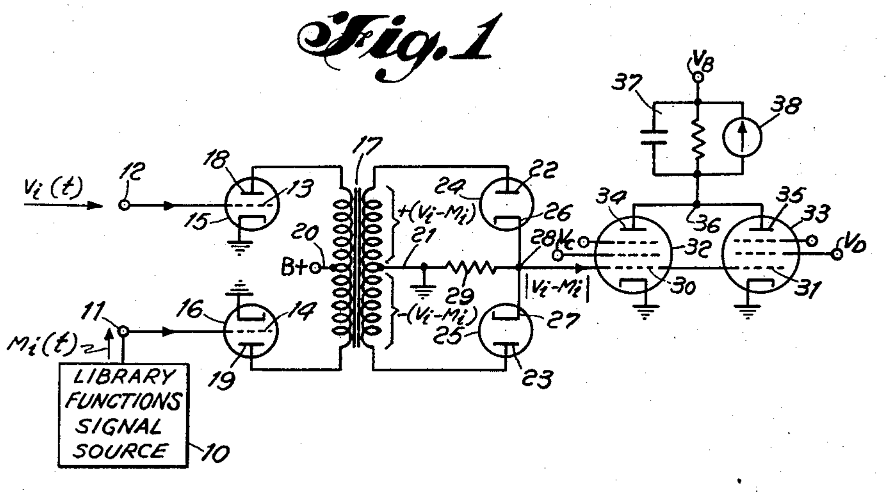
Fig. 1 is a schematic diagram of a correlation device.

In Fig. 1 there is shown a library or source 10 of signals of different waveforms connected to the input terminal 11. The two input terminals 11 and 12 are coupled to grids 13 and 14 of the associated amplifiers 15 and 16. A transformer 17 has the ends of its primary winding coupled to the anodes 18 and 19 respectively of the amplifiers 15 and 16. The midpoint 20 of the primary side is tapped to B+. The secondary winding of the transformer has its midpoint 21 tapped to ground and has its opposite ends respectively coupled to the anodes 22 and 23 of the rectifiers 24 and 25. The cathodes 26 and 27 respectively of the rectifiers 24 and 25 are coupled to a common point 28. The resistor 29 is coupled between the common point 28 and ground. There is also coupled to the common point 28 a pair of control grids 30 and 31 respectively of tubes 32 and 33 biased near cut off for square law current characteristic. The anodes 34 and 35 respectively of the two square law tubes 32 and 33 are connected to a common point 36 which is in turn coupled to an integrating circuit 37. There is an indicating device 38 coupled across the integrating circuit 37.

Figure 2:
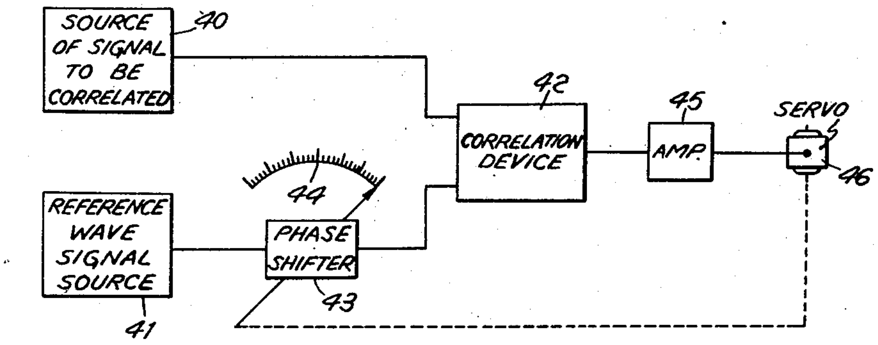
Fig. 2 is a block diagram showing the correlation device in combination with a servo loop being used as a phase detector.

In Fig. 2 there is shown a source of the signal to be correlated at 40 and a reference wave signal source at 41. The source 40 is coupled directly to a correlation device 42, such as that shown in Fig. 1, while the reference signal source 41 is coupled through a phase shifter 43 to the correlation device 42 and an indication device 44 is coupled to the phase shifter 43. In addition to the phase shifter means 43, the servo loop includes the amplifier 45 and the servo motor 46. The operation of the correlation system will become clear in view of the following discussion.

Let us assume that there is a known signal function $M_1(t)$ and that there is a second signal function $V_i(t)$ which in fact equals a randomly perturbed version of $M_1(t)$. Two signals being correlated by this system need not have the relationship of our assumed signals, but the relationship was assumed since there are ready applications for a correlation system used for correlating two signals which have the assumed relationship. In Fig. 1 $V_1(t)$ is shown being applied to the input terminal 11 and $M_1(t)$ is shown being applied to the input terminal 12. $V_1(t)$ will be amplified by the amplifier 15 such that there will appear across the upper portion of the primary winding an amplified signal $V_1(t)$. In a like manner $M_1(t)$ will be amplified by amplifier 16 and there will appear across the lower portion of the primary winding an amplified signal $M_1(t)$. Each of these signals are induced in the secondary winding of transformer 17 such that there appears across the secondary winding of transformer 17 a difference signal identified as $(V_i-M_i)$. By choosing the proper number of turns for the secondary winding in transformer 17 and tapping the midpoint 21 to ground there appears on the upper half of the secondary winding a positive value of the difference signal $(V_i-M_i)$ and on the lower half of the secondary winding there appears a negative value of the difference signal $(V_i-M_i)$, both of which are shown in the drawing. Diodes 24 and 25 perform a full wave rectification of the difference signal such that as shown in the drawing at 28 there appears what can be termed the absolute value of the difference signal $(V_i-M_i)$. The pentodes shown at 32 and 33 can be any well-known tubes, such as 6AU6 tubes. The application of the difference signal to the control grids 30 and 31 results in an output signal at 36 which is proportional to the square of the input signal $(V_i-M_i)$. The output signal at 36 which is the squared difference signal is passed to the integrating circuit 37 whereat there is performed an integrating operation. There is shunted across the integrating circuit 37 an indicating device 38 which indicates the value of the integrated signal which in effect is an indication of the correlation between the two input signals $V_1(t)$ and $M_1(t)$. A series of input signals $V_1(t)$ from the library source 10 is compared with $M_1(t)$ and when a particular signal $V_1(t)$ gives rise to a minimum indication, then there is a "best match" according to the "least" means squared difference.

The screen grids of the pentodes 32 and 33 are shown to be coupled to two different potentials $V_c$ and $V_d$ whereby the control grid cutoff points of the pentodes 32 and 33 are so adjusted that the combined characteristics of the pentodes in parallel can effect an increase in the range of square law detection as compared to a single pentode.

In Fig. 2 the correlation device is shown as part of a phase detecting arrangement. The correlation device 42 operates in the same fashion as was described above in connection with Fig. 1. Assume that the object of the arrangement in Fig. 2 is to compare two signals which are identical excepting for the phase relationship. In order to provide for a more stable operation, the amplifier 45 is chosen to have a predetermined threshold level above which the output signal of the correlation device must be maintained in order to operate the servo loop. The mean squared difference signal is amplified at 45 to drive the servo motor 46 which in turn adjusts the phase shifter 43 until the phase of the signal from source 40 and the signal from source 41 is identical. When the two signals are in phase, the output of the correlation device will be at a minimum or null and the servo motor 46 will no longer be driven to adjust the phase shifter 43. There is attached to the phase shifter 43, an indicating device 44 which indicates the difference between the phase of the signal being received from source 40 and the signal being received from source 41.

While I have described above the principles of my invention in connection with specific apparatus, it is to be clearly understood that this description is made only by way of example and not as a limitation to the scope of my invention as set forth in the objects thereof and in the accompanying claims.

I claim:

1. A correlation device for determining the correlation between a first and second input signal comprising a first and second input signal source, subtraction means coupled to said input sources for subtracting said first signal from said second signal to obtain a difference signal, means coupled to said subtraction means for squaring said difference signal, and integrating means coupled to said squaring means to integrate said output to obtain a correlation signal representative of the correlation between said first and said second input signals.

2. A correlation device for determining the correlation between a first and second input signal comprising a first and second input signal source, subtraction means coupled to said input sources for subtracting said first signal from said second signal to obtain a difference signal, means coupled to said subtraction means for squaring said difference signal, integrating means coupled to said squaring means to integrate said output and indicating means coupled to said integrating means to indicate the value of the integrated signal thereat.

3. A correlation device for determining the correlation between a first and second input signal comprising a first and second input signal source, subtraction means coupled to said input sources for subtracting said first signal from said second signal to obtain a difference signal, deriving means coupled to said subtraction means for deriving from said difference signal a direct current voltage proportional to the amplitude thereof, means coupled to said deriving means for producing an output signal proportional to the square of said voltage signal, integrating means coupled to said squaring means to integrate said output and indicating means coupled to said integrating means to indicate the value of the integrated signal thereat.

4. A correlation device according to claim 3, wherein said subtraction means includes a transformer having a primary and secondary sides, said primary side having its opposite ends respectively coupled to an associated one of said input terminals and having its midpoint tapped to a first reference potential, and said secondary side having its midpoint tapped to a second reference potential.

5. A correlation device according to claim 3, wherein said deriving means includes a first and second diode, one each of which is coupled to an associated opposite end of the secondary side of said transformer to effect a full wave rectification of said difference signal.

6. A correlation device according to claim 3, wherein said means for squaring said difference signal includes a square law detector means.

7. A correlation device according to claim 3, wherein said means for squaring said difference signal comprises a first and second pentode coupled in parallel having square law characteristics, said first pentode having the voltage supply of its screen grid at a first potential and said second pentode having the voltage supply of its screen grid at a second potential differing from said first potential such that the characteristic region for square law detection is increased by the combination over that of a single pentode.

8. A correlation device for determining the correlation between a first and second input signal comprising a first and second input signal source, a first and second amplifier respectively coupled to an associated input source, a transformer having a primary and a secondary winding to subtract said first signal from said second signal and obtain a difference signal, said primary side having its opposite ends respectively coupled to an associated one of the outputs of said amplifiers and having its midpoint tapped to a first reference potential, said secondary side having its midpoint tapped to a second reference potential to effect a negative value of said difference signal between one of its ends and said midpoint and to effect a positive value of said difference signal between the other end and said midpoint, a first and second diode respectively coupled to an associated end of said secondary side to effect a full wave rectification of said difference signal, circuitry means coupling the outputs of said diodes, a first and second pentode each having square law characteristics and each having their respective control grids coupled to said circuitry means to effect a square law amplification of said difference signal, said first pentode having its screen grid coupled to a first bias potential, said second pentode having its screen grid coupled to a second bias potential to increase the characteristic square law region when said first and said second pentode are coupled in parallel, an integrating circuit coupled to the output of said pentodes to integrate the signal therefrom and indicating means coupled to said integrating circuit to indicate the value of the integrated signal thereat.

9. A phase detecting arrangement for determining the phase relationship between two signals comprising a first and second input signal source, a variable phase shifting means including an indicating means, subtraction means circuitry coupled respectively to said first input source and through said phase shifting means to said second input source for subtracting said first signal from said second signal to obtain a difference signal, means coupled to said subtraction means for squaring said difference signal, integrating means coupled to said squaring means to integrate said output, a servo loop means coupled between said integrating means output and said phase shifting means driven by said integrated signal to adjust said phase shifting means to shift said second signal to be in phase with said first signal and indicating means coupled to said loop and driven thereby to indicate the phase difference between the two input signals.

10. A correlating arrangement for determining a "best match" correlation between a plurality of signals and a second signal by the method of least mean squared difference comprising a source of plurality of signals each having a different wave shape, a source of a second signal, a first input means coupled to said plurality signal source, a second input means coupled to said second signal source, subtraction means coupled to said input means for individually subtracting each of said plurality signals from said second signal to obtain a plurality of difference signals, means coupled to said subtraction means for squaring each of said difference signals, integrating means coupled to said squaring means to integrate each of said squared signals to obtain a plurality of correlation signals for comparison with each other to determine the "best match" for said second signal by the method of least mean squared difference.

11. A correlation device for determining the correlation between a first and second input signal comprising a first and second input signal source, subtraction means coupled to said input sources for subtracting said first signal from said second signal to obtain a difference signal, deriving means coupled to said subtraction means for deriving a signal equal to said difference signal raised to an even power, an integrating means coupled to said deriving means to integrate said output to obtain a correlation signal representative of the correlation between said first and second input signals.

12. A correlation device for determining the correlation between a first and second input signal comprising a first and second input signal source, subtraction means coupled to said input sources for subtracting said first signal from said second signal to obtain a difference signal, first means coupled to said subtraction means for producing from said difference signal a direct current voltage proportional to the amplitude thereof, second means coupled to said first means for producing an output signal proportional to an even power of said difference voltage signal, integrating means coupled to said second means to integrate said output and indicating means coupled to said integrating means to indicate the value of the integrated signal thereat.

References Cited in the file of this patent

UNITED STATES PATENTS

| | | |
|---|---|---|
| 2,405,073 | Troell | July 30, 1946 |
| 2,416,517 | Farrow | Feb. 25, 1947 |
| 2,428,180 | Scherbatskoy | Sept. 30, 1947 |